United States Patent
Fujiwara

(10) Patent No.: US 12,326,683 B2
(45) Date of Patent: *Jun. 10, 2025

(54) IMAGE FORMING APPARATUS AND METHOD TO FORM AN INVISIBLE IMAGE AND A VISIBLE IMAGE IN A MULTI-PASS SIMPLEX MANNER

(71) Applicant: Ricoh Company, Ltd., Tokyo (JP)

(72) Inventor: Yasuhiro Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 101 days.

This patent is subject to a terminal disclaimer.

(21) Appl. No.: 18/219,121

(22) Filed: Jul. 7, 2023

(65) Prior Publication Data

US 2023/0350332 A1 Nov. 2, 2023

Related U.S. Application Data

(63) Continuation of application No. 17/504,501, filed on Oct. 19, 2021, now Pat. No. 11,754,959.

(30) Foreign Application Priority Data

| Oct. 29, 2020 | (JP) | 2020-181468 |
| Apr. 2, 2021 | (JP) | 2021-063535 |

(51) Int. Cl.
*G03G 15/00* (2006.01)
*G03G 15/01* (2006.01)
(Continued)

(52) U.S. Cl.
CPC ..... *G03G 15/5095* (2013.01); *G03G 15/0142* (2013.01); *G03G 15/1645* (2013.01);
(Continued)

(58) Field of Classification Search
CPC ........... G03G 15/5095; G03G 15/0142; G03G 15/1645; G03G 15/6582; G03G 15/6585;
(Continued)

(56) References Cited

U.S. PATENT DOCUMENTS

| 2011/0116812 A1 | 5/2011 | Shifley |
| 2015/0338759 A1 | 11/2015 | Ida |

(Continued)

FOREIGN PATENT DOCUMENTS

| JP | 2006-227294 A | 8/2006 |
| JP | 2007-078981 A | 3/2007 |

(Continued)

OTHER PUBLICATIONS

Office Action issued Aug. 27, 2024 in corresponding Japanese Patent Application No. 2021-063535.

*Primary Examiner* — Joseph S Wong
(74) *Attorney, Agent, or Firm* — XSENSUS LLP

(57) ABSTRACT

An image forming apparatus includes an image forming device that forms an image on a recording medium and circuitry that controls the image forming device. The image forming device forms an invisible image with an invisible material on the recording medium and forms a visible image with a visible material on the invisible image. Each of first and second adhesion amounts includes respective adhesion amounts of the visible material and the invisible material per unit area in a portion, in which the visible image is formed on the invisible image, of the composite image. The second adhesion amount is smaller than the first adhesion amount. The controller adjusts the amount of the invisible material included in the second adhesion amount to be smaller than that included in the first adhesion amount, to cause the image forming device to form the image according to the second adhesion amount.

8 Claims, 7 Drawing Sheets

(51) Int. Cl.
*G03G 15/16* (2006.01)
*H04N 1/60* (2006.01)

(52) U.S. Cl.
CPC ..... *G03G 15/6582* (2013.01); *G03G 15/6585* (2013.01); *H04N 1/6072* (2013.01); *G03G 2215/0043* (2013.01); *G03G 2215/00578* (2013.01); *G03G 2215/00582* (2013.01); *G03G 2215/00932* (2013.01); *G03G 2215/2077* (2013.01)

(58) Field of Classification Search
CPC . G03G 2215/0043; G03G 2215/00578; G03G 2215/00582; G03G 2215/00932; G03G 2215/2077; H04N 1/6072
See application file for complete search history.

(56) References Cited

U.S. PATENT DOCUMENTS

| | | |
|---|---|---|
| 2019/0196363 A1 | 6/2019 | Tanaka et al. |
| 2019/0204760 A1 | 7/2019 | Suzuki et al. |
| 2020/0278618 A1 | 9/2020 | Kanatani et al. |

FOREIGN PATENT DOCUMENTS

| | | |
|---|---|---|
| JP | 2007-299096 A | 11/2007 |
| JP | 2008-035448 A | 2/2008 |
| JP | 2013-070221 A | 4/2013 |
| JP | 2013-080128 A | 5/2013 |
| JP | 2013-097211 A | 5/2013 |
| JP | 2015-225105 A | 12/2015 |
| JP | 2016-158161 A | 9/2016 |
| JP | 2018-060169 A | 4/2018 |
| JP | 2019-082517 A | 5/2019 |
| JP | 2019-117372 A | 7/2019 |
| JP | 2020-034593 A | 3/2020 |
| JP | 2020-140123 A | 9/2020 |

| | VISIBLE IMAGE | | ADHESION AMOUNT OF VISIBLE DEVELOPER [mg/cm$^2$] | ADHESION AMOUNT OF INVISIBLE DEVELOPER [mg/cm$^2$] | SIZE OF INVISIBLE IMAGE [mm x mm] |
|---|---|---|---|---|---|
| (1) | CYAN | HATCHED | 0.16 | 0.10 | 25 × 25 |
| (2) | CYAN | SOLID | 0.32 | 0.20 | 22 × 22 |
| (3) | BLUE | HATCHED | 0.38 | 0.24 | 18 × 18 |
| (4) | BLUE | SOLID | 0.70 | 0.27 | 16 × 16 |
| (5) | GRAY | HATCHED | 0.55 | 0.25 | 17 × 17 |
| (6) | BLACK | SOLID | 1.10 | 0.30 | 15 × 15 |

(1) CYAN-HATCHED IMAGE
SIZE OF INVISIBLE IMAGE:
25mm × 25mm (4) BLUE-SOLID IMAGE
SIZE OF INVISIBLE IMAGE:
16mm × 16mm (6) BLACK-SOLID IMAGE
SIZE OF INVISIBLE IMAGE:
15mm × 15mm

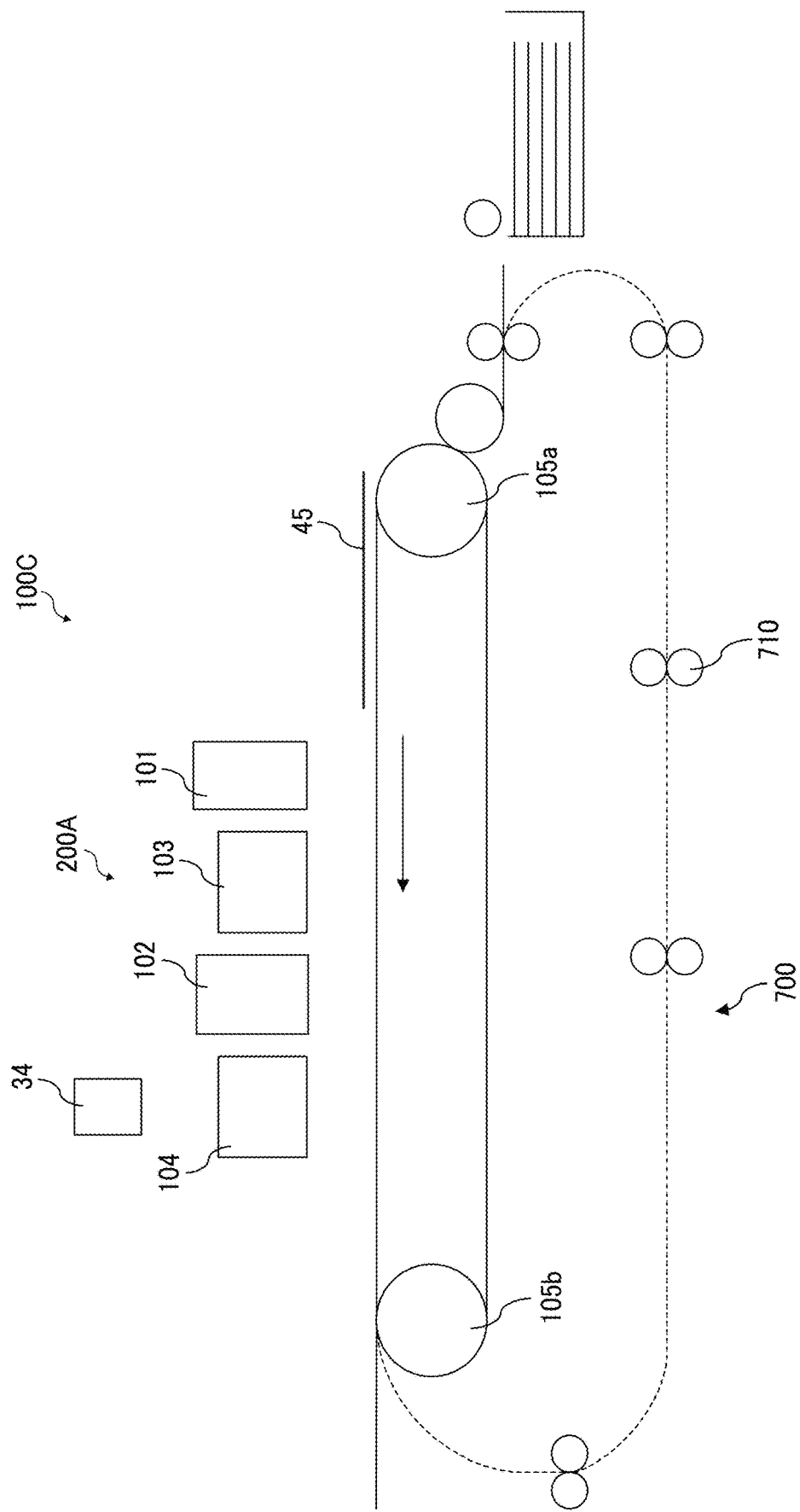

IMAGE FORMING APPARATUS AND METHOD TO FORM AN INVISIBLE IMAGE AND A VISIBLE IMAGE IN A MULTI-PASS SIMPLEX MANNER

CROSS-REFERENCE TO RELATED APPLICATIONS

This patent application is a continuation of U.S. application Ser. No. 17/504,501, filed on Oct. 19, 2021, which is based on and claims priority pursuant to 35 U.S.C. § 119(a) to Japanese Patent Application Nos. 2020-181468, filed on Oct. 29, 2020, and 2021-063535, filed on Apr. 2, 2021, in the Japan Patent Office, the entire disclosure of each of which is hereby incorporated by reference herein.

BACKGROUND

Technical Field

Embodiments of the present disclosure relate to an image forming apparatus.

Related Art

As the copying performance of recent image forming apparatuses has been improved, it has been hard to distinguish between a legitimate copy and an illegal copy. For the purpose of preventing illegal copying and protecting copyrights, there has been proposed a technology of forming, on a recording medium, an invisible image that is hardly recognized by naked eyes, in addition to a visible image that is recognized by naked eyes.

SUMMARY

In one embodiment of the present disclosure, a novel image forming apparatus includes an image forming device and circuitry. The image forming device forms an image on a recording medium. The circuitry controls the image forming device. The image forming device forms, on the recording medium, an invisible image with an invisible material and a visible image with a visible material on the invisible image to form a composite image in which the invisible image is closer to the recording medium than the visible image is. In a case in which a first adhesion amount includes respective adhesion amounts of the visible material and the invisible material per unit area in a portion, in which the visible image is formed on the invisible image, of the composite image and a second adhesion amount is smaller than the first adhesion amount and includes the respective adhesion amounts of the visible material and the invisible material per unit area in the portion, the circuitry adjusts the amount of the invisible material included in the second adhesion amount to be smaller than the amount of the invisible material included in the first adhesion amount, to cause the image forming device to form the image according to the second adhesion amount.

Also described is a novel image forming method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 12 is a diagram illustrating part of another example of the image forming apparatus of FIG. 11.

Figure 1:
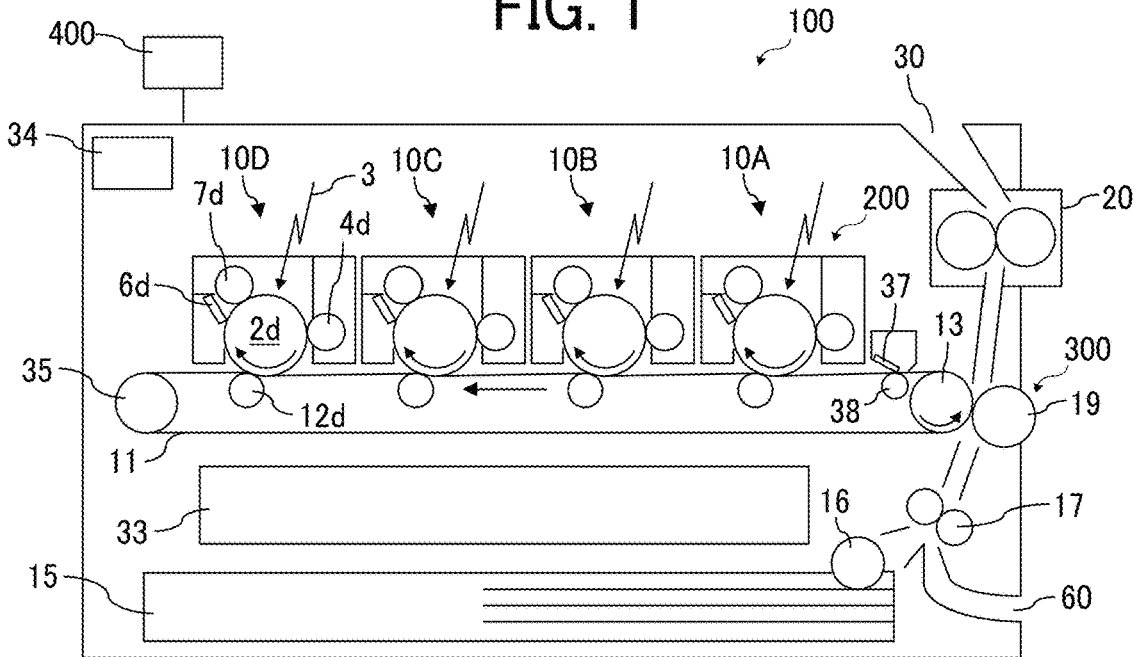
FIG. 1 is a schematic diagram illustrating an image forming apparatus including image forming stations according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K (or Bk) denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

In the following description, a color toner may be referred to as a visible toner. A color toner image may be referred to as a visible image. An invisible toner image may be referred to as an invisible image.

According to an embodiment of the present disclosure, an image forming apparatus includes an image forming device that forms an image on a recording medium and a controller or circuitry that controls the image forming device. Specifically, the image forming device forms, on the recording medium, an invisible image with an invisible material and a visible image with a visible material on the invisible image to form a composite image in which the invisible image is closer to the recording medium than the visible image is. A first adhesion amount includes respective amounts of the visible material and the invisible material per unit area in a portion, in which the visible image is formed on the invisible image, of the composite image as a given image. A second adhesion amount is smaller than the first adhesion amount and includes respective amounts of the visible material and the invisible material per unit area in the portion, in which the visible image is formed on the invisible image, of the composite image. The controller adjusts the amount of the invisible material included in the second adhesion amount to be smaller than the amount of the invisible material included in the first adhesion amount, to cause the image forming device to form the image according to the second adhesion amount.

Now, a description is given of an image forming apparatus according to an embodiment of the present disclosure.

According to the present embodiment, the image forming apparatus is an electrophotographic image forming apparatus that forms an image by electrophotography. The image forming apparatus includes an image bearer, a charger that charges the image bearer, an exposure device that exposes the image bearer to form an electrostatic latent image on the image bearer, a developing device that visualizes, with a developer, the electrostatic latent image formed on the image bearer to form a visual image on the image bearer, and a transfer device that includes an intermediate transferor to transfer the visual image from the image bearer onto the intermediate transferor and transfers the visual image from the intermediate transferor onto a recording medium.

The image forming apparatus includes an image forming device that includes the image bearer, the charger, the exposure device, the developing device, and the transfer device.

The developing device visualizes the electrostatic latent image with a visible developer as a visible material to form the visual image with the visible developer and visualizes the electrostatic latent image with an invisible developer as an invisible material to form the visual image with the invisible developer.

The transfer device transfers the visual image formed with the visible developer as the visible image and the visual image formed with the invisible developer as the invisible image to form the composite image including the visible image formed on the invisible image on the recording medium. In other words, the visible image refers to the visual image formed with the visible developer and transferred onto the recording medium; whereas the invisible image refers to the visual image formed with the invisible developer and transferred onto the recording medium.

In a case in which the image forming device forms the invisible image according to the second adhesion amount, the controller adjusts the amount of the invisible developer on the intermediate transferor to be smaller than the amount of the invisible developer on the intermediate transferor in a case in which the image forming device forms the invisible image according to the first adhesion amount.

FIG. 1 is a schematic cross-sectional diagram illustrating an image forming apparatus 100 as a printer according to the present embodiment.

The image forming apparatus 100 illustrated in FIG. 1 includes an intermediate transfer belt 11, which is an endless belt serving as an intermediate transferor.

Four image forming stations 10A, 10B, 10C, and 10D, which may be referred to as image forming units, are arranged side by side along an upper rotating portion of the intermediate transfer belt 11 in FIG. 1. The image forming apparatus 100 of the present embodiment includes a tandem image forming portion in which the image forming stations 10A, 10B, 10C, and 10D are arranged side by side.

The image forming stations 10A, 10B, 10C, and 10D have substantially the same configurations, differing from each other in the color of toner employed, for example. As a representative of the image forming stations 10A, 10B, 10C, and 10D, FIG. 1 denotes, by reference numerals, the components of the image forming station 10D, which is the most downstream image forming station in a direction of rotation of the intermediate transfer belt 11.

In the present embodiment, for example, the image forming stations 10A, 10B, 10C, and 10D form toner images of yellow (Y), magenta (M), cyan (C), and black (K), respectively. Although the black image forming station 10D is preferably located downstream from the other image forming stations 10A, 10B, and 10C in the direction of rotation of the intermediate transfer belt 11, the location of the four image forming stations 10A, 10B, 10C, and 10D is not limited to the location illustrated in FIG. 1. In other words, the location of the four image forming stations 10A, 10B, 10C, and 10D are changeable as appropriate.

The image forming station 10D includes, e.g., a drum-shaped photoconductor 2d serving as an image bearer, a charger 7d, a developing device 4d, a primary transfer roller 12d, and a cleaner 6d. Each of the image forming stations 10A, 10B, and 10C also includes the photoconductor 2, the charger 7, the developing device 4, the primary transfer roller 12, and the cleaner 6.

In the following description, the image forming stations 10A, 10B, 10C, and 10D may be collectively referred to as the image forming stations 10 or the image forming station 10 when the image forming stations 10A, 10B, 10C, and 10D are described without distinction. The same applies to the photoconductor 2, the charger 7, the developing device 4, the primary transfer roller 12, and the cleaner 6.

As illustrated in FIG. 1, the image forming station 10 includes, e.g., the charger 7, the developing device 4, the primary transfer roller 12, and the cleaner 6, which are disposed around the photoconductor 2.

In the present embodiment, the photoconductor 2 as an image bearer is a cylindrical drum-shaped photoconductor having a diameter of 30 mm. The photoconductor 2 rotates at a peripheral speed of, e.g., from 50 mm/s to 200 mm/s.

A roller-shaped charger 7 is pressed against the surface of the photoconductor 2. The charger 7 is rotated by the rotation of the photoconductor 2. As a high-voltage power supply applies a bias of a direct current (DC) or a bias of an alternating current (AC) superimposed on the DC to the charger 7, the charger 7 uniformly charges the photoconductor 2. The surface potential of the charged photoconductor 2 is not particularly limited. For example, the surface of the photoconductor 2 is charged to a surface potential of −500 V.

An exposure device exposes the photoconductor 2 with exposure light 3 according to image data to form an electrostatic latent image on the photoconductor 2. In an exposure process, a light emitting diode (LED) or a laser beam scanner including a laser diode may be used, for example. In the exposure process, the surface potential of an exposed portion of the photoconductor 2 drops to −50 V, for example.

The developing device 4 develops, with a developer, the electrostatic latent image formed on the photoconductor 2 as a visual image, which may be referred to as a toner image. In a developing process, for example, the developing device 4 develops the electrostatic latent image with a given developing bias of, e.g., −200 V supplied from a high-voltage power supply.

In the developing process of the present embodiment, one-component development, which may be referred to as a one-component contact development, is mainly employed. In other words, the developing device 4 is supplied with one-component toner. For example, the one-component toner has a negative charging polarity. In the present embodiment, the one-component developing method is described. Alternatively, a two-component developing method may be employed.

While the photoconductor 2 rotates in a direction indicated by arrow in FIG. 1, the charger 7 charges the photoconductor 2, the exposure device irradiates the charged photoconductor 2 with the exposure light 3 to form an electrostatic latent image on the photoconductor 2, and the developing device 4 renders the electrostatic latent image formed on the photoconductor 2 visible as a visual image.

The primary transfer roller 12 primarily transfers the visual image from the photoconductor 2 onto the intermediate transfer belt 11. The intermediate transfer belt 11 is entrained around and rotated by a belt conveyance roller 35 and a secondary transfer opposed roller 13 in a direction indicated by arrow in FIG. 1.

On the other hand, a sheet feeding roller 16 serving as a sheet feeder and a conveyance roller pair 17 feed and convey a recording medium from an input tray 15. The recording medium may be supplied from a bypass feeder 60. When the recording medium passes between the secondary transfer opposed roller 13 and a secondary transfer roller 19, the visual image is secondarily transferred from the intermediate transfer belt 11 onto the recording medium.

In the present embodiment, the transfer device transfers a visual image formed on the image bearer to the intermediate transferor. The transfer device then transfers the visual image from the intermediate transferor onto a recording medium. Specifically, a transfer device 300 of the present embodiment includes, e.g., the primary transfer roller 12 and the secondary transfer roller 19 to transfer the visual image formed on the image bearer onto the intermediate transferor and then transfer the visual image from the intermediate transferor onto the recording medium.

The visual image on the recording medium is then fixed by a fixing device 20. After passing through the fixing device 20, the recording medium is ejected onto an output tray 30. Thus, the image forming apparatus 100 forms an image.

Optionally, a belt cleaning blade 37 may be disposed together with an opposed roller 38 to clean the intermediate transfer belt 11.

Optionally, the image forming apparatus 100 may include a waste toner bottle 33. The waste toner bottle 33 collects the toner that has failed to be transferred from the photoconductor 2 and that is scraped off from a cleaning blade. The waste toner bottle 33 also collects the toner that has failed to be transferred from the intermediate transfer belt 11 and that is scraped off from the belt cleaning blade 37.

FIG. 1 schematically illustrates a controller 34. The controller 34 is, e.g., a central processing unit (CPU). The controller 34 controls, e.g., the developing device and the transfer device. For example, the controller 34 changes an amount of an invisible developer per unit area in an invisible image, according to an amount of a visible developer per unit area in a visible image on a recording medium.

Now, a detailed description is given of the image forming station 10.

In a case in which a full-color image is formed, the yellow, magenta, cyan, and black visual images are primarily transferred in this order, for example, onto the intermediate transfer belt 11. Note that the order in which the toner images are transferred is changeable as appropriate. In a case in which the yellow, magenta, cyan, and black visual images are transferred in this order onto the intermediate transfer belt 11, the black, cyan, magenta, and yellow visual images are secondarily transferred in this order onto a recording medium as a composite image. In the present example of FIG. 1, the lowermost layer of the composite image on the recording medium is the visual image formed with the developer by the image forming station 10D, which is located downstream from the other image forming stations 10 in the direction of rotation of the intermediate transfer belt 11.

The developing device in the present embodiment forms a visual image with a visible developer as a visible material and a visual image with an invisible developer as an invisible material. For example, with the primary transfer rollers 12, the transfer device 300 transfers, onto the intermediate transfer belt 11, the visual image formed with the visible developer and the visual image formed with the invisible developer. Thereafter, with the secondary transfer roller 19, the transfer device 300 transfers the visual image formed with the visible developer and the visual image formed with the invisible developer from the intermediate transfer belt 11 onto a recording medium at once.

In the present embodiment, the images are visualized and transferred so that a visible image, which is an image formed with the visible developer, is superimposed on an invisible image, which is an image formed with the invisible developer, on a recording medium. To attain such visualization and transfer, for example, an image forming station 10 that performs the developing process with the invisible developer may be disposed downstream from the other image forming stations 10 in the direction of rotation of the intermediate transfer belt 11. Note that the image forming station 10 that performs the developing process with the invisible developer may be referred to as the image forming station 10 employing the invisible developer in the following description.

For example, the image forming station 10 employing the invisible developer may be disposed downstream from the image forming station 10D. In this case, the images formed with the visible developers rest on the image formed with the invisible developer on a recording medium. In this case, the five image forming stations 10 are disposed.

Referring again to the configuration of the image forming apparatus 100 of the present example, the image forming apparatus 100 includes a plurality of image forming stations each including the image bearer, the charger, and the developing device. The image forming station including the developing device that visualizes an electrostatic latent image with an invisible developer is disposed downstream from the other image forming stations in a direction of rotation of the intermediate transferor.

Instead, for example, the black image forming station 10D may be used an image forming station employing an invisible developer. In this case, visible images are formed with yellow (Y), magenta (M), and cyan (C) developers; whereas an invisible image is formed with an invisible developer (K or Bk).

Figure 2:
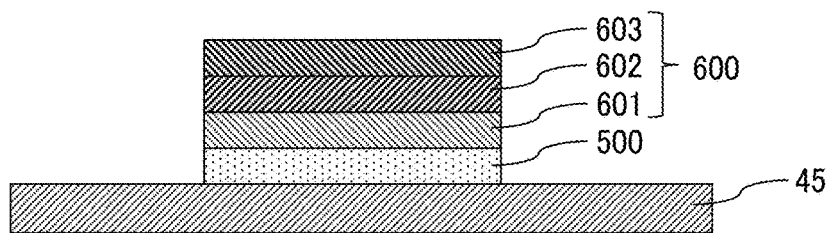
FIG. 2 is a schematic cross-sectional view of an image on a recording medium according to an embodiment of the present disclosure.

Referring now to FIG. 2, a description is given of the case described above.

FIG. 2 schematically illustrates an image on a recording medium.

In the present example illustrated in FIG. 2, a composite image including an invisible image 500 and a visible image 600 is formed on a recording medium 45. As illustrated in FIG. 2, the visible image 600 rests on the invisible image 500. The visible image 600 includes a cyan image 601, a magenta image 602, and a yellow image 603. In the present embodiment, the invisible image 500 is located as the lowermost layer of the composite image on the recording medium 45. A description of another example in which the black image forming station 10 is used as an image forming station employing the invisible developer is deferred in another embodiment.

Since the invisible image 500 is formed below the visible image 600, the invisible image 500 may be described as being embedded in the visible image 600. The invisible image 500, formed below the visible image 600, is an image that is not visually recognized or is unlikely to be visually recognized.

In consideration of the relative positions of the invisible image 500 and the visible image 600 on the recording medium 45, the image forming station 10 employing the invisible developer is preferably located downstream from the other image forming stations 10 in the direction of rotation of the intermediate transfer belt 11. However, the location of the image forming station 10 employing the invisible developer is not limited to the aforementioned location. Alternatively, for example, any one of the image forming stations 10A, 10B, and 10C in the example illustrated in FIG. 1 may be used as an image forming station employing an invisible developer, provided that an invisible image is located as the lowermost layer of a composite image on a recording medium.

Formation of a composite image including an invisible image and a visible image resting on the invisible image on a recording medium allows embedment of additional information in the composite image. For example, embedding an invisible image allows identification of an illegal copy. In the present embodiment, since the invisible image is the lowermost layer of the composite image on the recording medium, the invisibility of the invisible image is enhanced. In short, the invisible image is unlikely to be visually recognized.

The developing device of the present embodiment mainly employs the one-component development. In other words, the term "developer" mainly refers to toner. The term "visible developer" refers to visible toner; whereas the term "invisible developer" refers to invisible toner. In the present embodiment, the one-component developing method is described. Alternatively, the developing device may employ the two-component developing method.

In the present embodiment, the visible developer and the invisible developer are different from each other in, e.g., the degree of absorption of visible light and the degree of absorption of infrared light.

The visible developer and the invisible developer are also different from each other in material. For example, the visible developer and the invisible developer are different from each other in whether an infrared light absorbing material is included. Specifically, the invisible developer includes the infrared light absorbing material; whereas the visible developer does not include or substantially does not include the infrared light absorbing material.

The invisible developer may include a colorant and may have a color tone.

In addition, the invisible developer may absorb ultraviolet rays. The visible developer and the invisible developer may be distinguished from each other by the difference in the degree of absorption of ultraviolet rays.

As described above, the configuration of the image forming station employing the invisible developer is selectable as appropriate.

Figure 3:
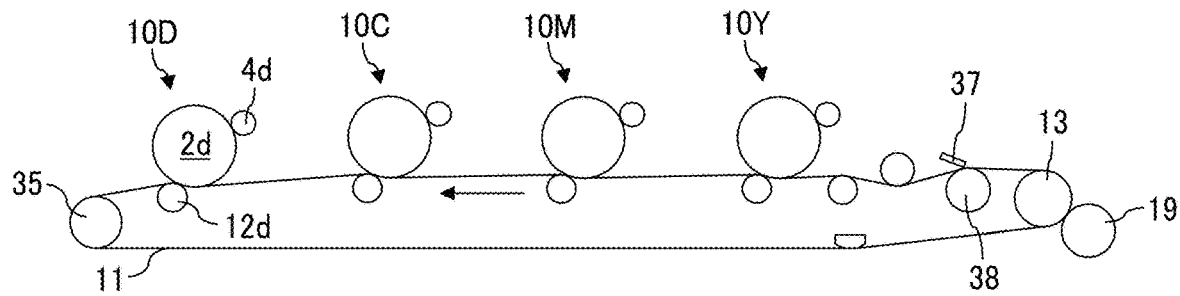
FIG. 3 is a schematic diagram illustrating another example of the image forming stations included in the image forming apparatus of FIG. 1.

Referring now to FIG. 3, a description is given of another example of the image forming stations 10.

FIG. 3 is a schematic diagram illustrating another example of the image forming stations illustrated in FIG. 1, according to the present embodiment.

In the example illustrated in FIG. 3, the image forming station 10D, located downstream from other image forming stations 10C, 10M, and 10Y in the direction of rotation of the intermediate transfer belt 11, employs both a black developer and an invisible developer.

According to the present example, the black developer may be used when the invisible developer is not used.

In the present example, the image forming stations 10D, 10C, 10M, and 10Y employ the black developer, the cyan developer, the magenta developer, and the yellow developer, respectively, as visible developers. The image forming station 10D employing the black developer is disposed downstream from the other image forming stations 10C, 10M, and 10Y in the direction of rotation of the intermediate transfer belt 11. The black developer and the invisible developer are replaceable.

In other words, the black developer and the invisible developer are changeable as appropriate. For example, the image forming station 10D may be replaced as a unit. Alternatively, the invisible developer and the black developer may be included in respective replaceable units. In this case, the replaceable unit including the invisible developer is replaced separately from the replaceable unit including the black developer. Alternatively, a container (or a toner bottle) containing the black developer may be independent from a container containing the invisible developer. Similarly, the developing device 4d for the black developer may be independent from the developing device 4d for the invisible developer. In this case, the container and the corresponding developing device 4d may be replaced together. Alternatively, both the developing device 4d for the black developer and the developing device 4d for the invisible developer may be disposed around the photoconductor 2d. In this case, the developing device 4d for the black developer and the developing device 4d for the invisible developer are switched therebetween to perform the developing process.

The single image forming station 10 employing the invisible developer and the black developer as being replaceable downsizes the image forming apparatus 100.

Figure 4A:
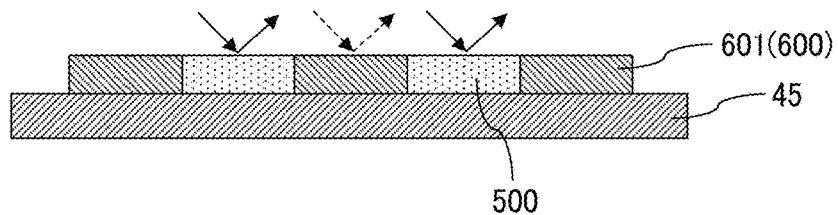
FIG. 4A is a schematic cross-sectional view of another example of the image on the recording medium of FIG. 2.
Figure 4B:
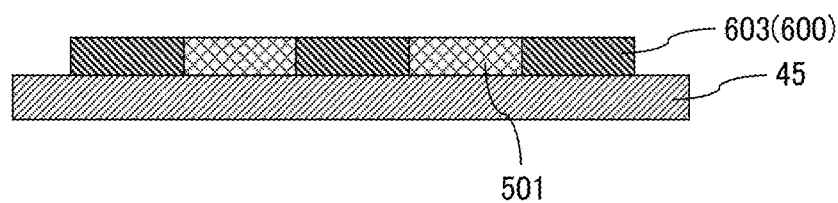
FIG. 4B is a schematic cross-sectional view of another example of the image on the recording medium of FIG. 4A.

Referring now to FIGS. 4A and 4B, a description is given of an example of how an invisible image is visually recognized.

FIG. 4A is a schematic cross-sectional view of an image including the invisible image 500 and the cyan image 601 formed on the recording medium 45.

FIG. 4A schematically illustrates visible light by arrows. Since the invisible image 500 is formed, the glossiness of the cyan image 601 (as the visible image 600) may change. When the glossiness of the cyan image 601 changes, the reflected light from the cyan image 601 also changes. As a result, the position of the invisible image 500 may be recognized.

To prevent recognition of the position of the invisible image 500 and increase the invisibility of the invisible image 500, typically, the glossiness of a color image such as the cyan image 601 is reduced to reduce the change of the reflected light from the color image. However, such a typical way of reducing the glossiness of the color image may be insufficient to increase the invisibility of an invisible image 501 that includes a wavelength in a visible spectrum, as described below.

FIG. 4B is a schematic cross-sectional view of an image including the invisible image 501 and the yellow image 603 formed on the recording medium 45.

FIG. 4B illustrates an example in which the invisible image 501 that slightly includes a wavelength in the visible spectrum. In a case in which the invisible image 501 includes a material that reflects light in the visible spectrum, such as a yellow colorant, adjustment of the color image may be insufficient to increase the invisibility of the invisible image 501. In short, reducing the glossiness of the color image may be insufficient to improve the invisibility of the invisible image 501.

In the examples described above, the invisibility of the invisible image is to be improved to prevent visual recognition of the invisible image. To address such a situation, the inventors have made studies. For example, in the example illustrated in FIG. 4B, the amount of the invisible developer for forming the invisible image may be reduced; whereas the amount of the visible developer for forming the color image may be increased. However, simply reducing the amount of the invisible developer may increase the invisibility of the invisible image while decreasing the readability of a mechanical reading device. In this case, advantages such as prevention of unauthorized copying may be hardly attained.

As an alternative example to improve the invisibility of the invisible image, the color tone or density of the invisible developer may be adjusted. However, since the information of the visible image varies depending on the user, the color tone or density of the invisible developer may be hardly adjusted.

To address such situations, the inventors have made further studies and found that good results are obtained by controlling the amount of the invisible developer for forming the invisible image according to the information of the visible image. More specifically, the amount of the invisible developer per unit area in the invisible image is changed according to the amount of the visible developer per unit area in the visible image on a recording medium. Accordingly, the invisibility of the invisible image is enhanced. In addition, an image size of the invisible image is changed according to the amount of the visible developer per unit area in the visible image on a recording medium. Note that the image size of the invisible image may be simply referred to as a size of the invisible image or an area of the invisible image in the following description. Accordingly, when the amount of the invisible developer is relatively small, the image size is increased, for example, to ensure the machine readability.

In the present embodiment, the way of changing the amount of the invisible developer per unit area in the invisible image is selectable as appropriate. In order to increase or decrease the amount of the invisible developer per unit area, an area in which dots are formed per unit area may be controlled, for example. In this case, for example, the controller 34 may change the area to be exposed by the exposure device as a writing unit on the photoconductor 2. Alternatively, the controller 34 may change the voltage that is applied to a developing roller of the developing device 4 to change the amount of toner on the photoconductor 2, thus changing the amount of the invisible developer per unit area on a recording medium The controller 34 performs control as described above to change the amount of the invisible developer on the intermediate transfer belt 11 or the photoconductor 2, thus changing the amount of the invisible developer on a recording medium.

Unless otherwise specified, an amount of a visible developer on a recording medium or an amount of an invisible developer on a recording medium respectively refer to an amount of the visible developer per unit area in a visible image formed on the recording medium and an amount of the invisible developer per unit area in an invisible image formed on the recording medium.

Now, a description is given of changing the amount of the invisible developer per unit area in the invisible image.

Figure 5:
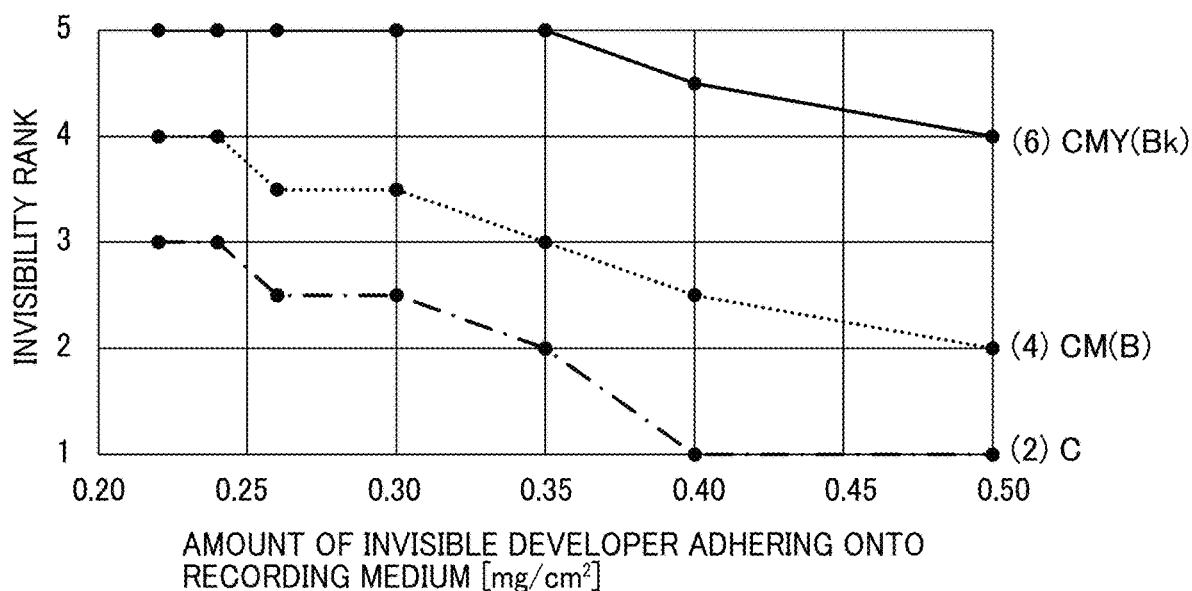
FIG. 5 is a graph illustrating a relationship between the invisibility and the amount of an invisible developer adhering onto a recording medium according to an embodiment of the present disclosure.

FIG. 5 is a graph illustrating a relationship between the invisibility and the amount of an invisible developer adhering onto a recording medium.

The horizontal axis indicates the amount of the invisible developer adhering onto the recording medium per unit area. The vertical axis indicates the invisibility sensory rank, which may be referred to as an invisibility rank.

The invisibility rank is obtained by ranking the invisibility of an invisible image with a numerical value of from 1 to 5 according to visual sensory evaluation performed by an evaluator. A smaller numerical value indicates that the invisible image is more visible. The invisibility rank is preferably 3 or more, more preferably 3.5 or more, and even more preferably a higher numerical value. When the invisible rank is 3 or more, the invisible image may be hard to visually recognize, thus ensuring the confidentiality of the invisible image.

Now, a description is given of an evaluation of the invisibility rank. Images are formed for the evaluation as below, for example.

Specifically, the images, which may be referred to as evaluation images in the following description, are formed with the image forming apparatus 100 illustrated in FIG. 1 including the image forming stations 10 illustrated in FIG. 3. Sheets of paper named "My Paper" (manufactured by Ricoh Co., Ltd.) are used as recording media, on which a barcode image of 15 mm×15 mm is formed as an invisible image. The developing and transfer processes are performed so that a visible image as described below is formed on the invisible image. Thus, an evaluation image is formed. Three types of evaluation images are formed according to the type of visible images as described below.

Specifically, three images are formed as visible images: (2) an image of a single color of cyan on the recording medium by an adhesion amount of 0.32 mg/cm$^2$, (4) an image of two colors of cyan and magenta on the recording medium by an adhesion amount of 0.70 mg/cm², and (6) an image of three colors of cyan, yellow, and magenta on the recording medium by an adhesion amount of 1.10 mg/cm². Note that (2), (4), and (6) in FIG. 5 correspond to (2), (4), and (6) in FIG. 7, respectively.

The adhesion amount on the recording medium is determined in consideration of the images of the respective colors in total. For example, regarding the image of (6) above, the adhesion amount of 1.10 mg/cm' is a total amount of the visible developers, namely, the cyan, yellow, and magenta developers with which the respective visible images are formed. As is clear from the unit of numerical values, the adhesion amount indicates an amount per unit area. The adhesion amount of the visible developer on the recording medium is a measured amount of the visible developer adhering to an area in which the invisible image is formed.

As a part of the evaluation image including the visible image described above, a barcode image is formed with different amounts of the invisible developer per unit area as indicated by the horizontal axis in FIG. 5. The amount of the invisible developer is a measured amount of the invisible developer in the area below the visible image.

FIG. 5 illustrates an evaluation result.

As is clear from FIG. 5, the invisibility rank varies depending on the amount of the visible developer in the visible image. When the evaluation images include the same amount of the invisible developer adhering onto the recording medium, the invisibility increases as the amount of the visible developer in the visible image increases. For example, when an amount of 0.50 mg/cm' of the invisible developer adheres onto the recording medium, in short, at the amount of 0.50 mg/cm' in the horizontal axis in FIG. 5, the invisibility rank increases in the order of (2), (4), and (6). Specifically, the images of (2), (4), and (6) are ranked 1, 2, and 4, respectively. This is because the amount of the visible developer on the invisible image increases.

On the other hand, the invisibility rank changes depending on the amount of the invisible developer adhering onto the recording medium. Specifically, as the amount of the invisible developer adhering onto the recording medium decreases, the invisibility rank increases. In other words, as the amount of the invisible developer adhering onto the recording medium increases, the invisibility rank decreases. In short, as the amount of the invisible developer increases, the invisible image gets more visible.

As described above, on the recording medium, as the amount of the visible developer per unit area increases or as the amount of the invisible developer per unit area decreases, the invisibility rank increases. A higher invisibility rank indicates that the invisible image is more unlikely to be visually recognized to ensure the confidentiality of the invisible image. In other words, a relatively large amount of visible developer per unit area ensures the confidentiality of an invisible image formed with an increased amount of invisible developer. By contrast, a relatively small amount of visible developer per unit area may fail to ensure a sufficient confidentiality of an invisible image formed with a relatively large amount of invisible developer. In short, the amount of the invisible developer is to be reduced to ensure the confidentiality of the invisible image.

To address such a situation, in the present embodiment, in a case in which an image is formed according to a second adhesion amount described below, an amount of an invisible material included in the second adhesion amount is controlled to be smaller than the amount of the invisible material included in a first adhesion amount described below. Accordingly, the invisibility of the invisible image is enhanced. When the respective amounts of the invisible material and the visible material per unit area in a portion, in which a visible image is superimposed on an invisible image, of an image are measured and when the invisible image is formed according to the second adhesion amount, the amount of the invisible material may be controlled to be smaller than the amount of the invisible material that is used when the invisible image is formed according to the first adhesion amount.

In the present embodiment, the first adhesion amount includes respective adhesion amounts of a visible material and an invisible material per unit area in a portion, in which a visible image is formed on an invisible image, of a composite image, as a given image, including the visible image and the invisible image. The second adhesion amount is smaller than the first adhesion amount and includes the respective amounts of the visible material and the invisible material per unit area in the portion, in which the visible image is formed on the invisible image, of the composite image.

Figures 6, 7:
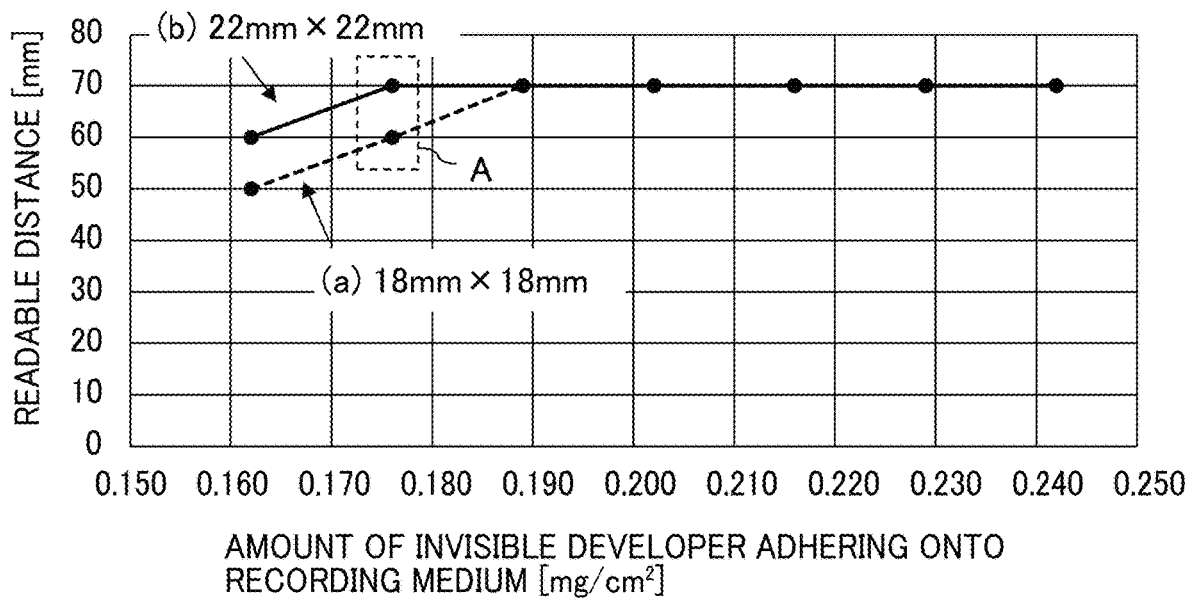
FIG. 6 is a graph illustrating a relationship between the readability and the amount of an invisible developer adhering onto a recording medium according to an embodiment of the present disclosure.
FIG. 7 is a table that is used for control of the amount of an invisible developer adhering onto a recording medium according to an embodiment of the present disclosure.

FIG. 6 is a graph illustrating a relationship between the readability of a mechanical reader and the amount of an invisible developer adhering onto a recording medium.

Like FIG. 5, the horizontal axis indicates the amount of the invisible developer adhering onto the recording medium per unit area. The vertical axis indicates a distance (specifically, a readable distance) between the reader and the recording medium when the invisible image is read by the mechanical reader. A shorter distance indicates a lower readability because the reader is closer to the recording medium. In the present example, the readability is determined sufficient when the readable distance is equal to or longer than 68 mm.

Now, a description is given of an evaluation of the machine readability. Images are formed for the evaluation as below, for example.

Like the evaluation described above with reference to FIG. 5, the evaluation images are formed with the image forming apparatus 100 illustrated in FIG. 1 including the image forming stations 10 illustrated in FIG. 3. Sheets of paper named "My Paper" (manufactured by Ricoh Co., Ltd.) are used as recording media. Two types of invisible images are formed on the recording media: (a) a barcode image of 18 mm×18 mm, and (b) a barcode image of 22 mm×22 mm.

The developing and transfer processes are formed so that a visible image of a single color of cyan is formed on each of the invisible images. Thus, the evaluation images are formed. As a visible image of a single color of cyan, a solid image of a single color of cyan is formed with an adhesion amount of 0.32 mg/cm' on the recording medium.

As a part of the evaluation image for the machine readability, the barcode image is formed with different amounts the invisible developer per unit area as indicated by the horizontal axis in FIG. 6. The mechanical reader is selectable as appropriate provided that the mechanical reader recognizes an invisible image.

FIG. 6 illustrates an evaluation result.

As is clear from FIG. 6, the readability varies depending on the amount of the invisible developer adhering onto the recording medium. Specifically, as the amount of the invisible developer adhering onto the recording medium increases, the readability also increases. In other words, as the amount of the invisible developer adhering onto the recording medium decreases, the readability also decreases. In short, as the amount of the invisible developer per unit area increases, the invisible image is more likely to be recognized by the mechanical reader.

In addition, as is clear from comparison of (a) and (b) in FIG. 6, the readability increases as the size of the invisible image (i.e., the barcode image) increases. For example, at a position A in FIG. 6, the readability is insufficient for the smaller image (a); whereas the readability is sufficient for the larger image (b).

In other words, the size of the invisible image is preferably controlled according to the amount of the visible developer. For example, in a case in which the amount of the visible developer is relatively small, the amount of the invisible developer is correspondingly small. In this case, the size of the invisible image is preferably increased. Accordingly, even in a case in which the amount of the invisible developer is relatively small, the readability of the mechanical reader is ensured.

Considering FIG. 6 alone, the amount of the invisible developer may be simply increased to ensure the readability of the mechanical reader. Considering FIG. 5 and FIG. 6 together, however, simply increasing the amount of the invisible developer lowers the invisibility, thus failing to ensure a sufficient confidentiality. In other words, the amount of the invisible developer may be sometimes reduced to ensure the invisibility. In short, the amount of the invisible developer is controlled according to the amount of the visible developer in the visible image. In a case in which the amount of the invisible developer is relatively small, the size of the invisible image is controlled to increase. Accordingly, both human invisibility and machine readability are attained.

FIG. 7 is a table with which an example of control is performed.

As described above, in FIG. 7, "adhesion amount of visible developer" indicates the amount of a visible developer per unit area in a visible image on a recording medium; whereas "adhesion amount of invisible developer" indicates the amount of an invisible developer per unit area in an invisible image on the recording medium.

As illustrated in FIG. 7, in the present embodiment, the amount of the invisible developer is controlled according to the amount of the visible developer. For example, in a case in which the adhesion amount of visible developer is relatively small, the adhesion amount of invisible developer is reduced to ensure the invisibility of the invisible image. In addition, in a case in which the adhesion amount of invisible developer is relatively small, the size of the invisible image is increased to prevent the machine readability. Thus, the present embodiment ensures both the invisibility and machine readability of the invisible image.

The controller of the present embodiment controls the amount of developer by, e.g., a first adhesion amount, a second adhesion amount, and a third adhesion amount as described below. In an example, the first adhesion amount is an amount of an invisible developer per unit area in an invisible image formed below a visible image as a first visible image. The second adhesion amount is an amount of the invisible developer when a visible image as a second visible image is formed with the visible developer smaller in amount per unit area than the visible developer in the first visible image. When the invisible image is formed according to the second adhesion amount, the amount of the invisible developer is controlled to be smaller than the amount of the invisible developer that is used when the invisible image is formed according to the first adhesion amount.

In another example, the first adhesion amount is an amount of an invisible developer per unit area in an invisible image formed below a visible image as a first visible image. The third adhesion amount is an amount of the invisible developer when a visible image as a second visible image is formed with the visible developer greater in amount per unit area than the visible developer in the first visible image. When the invisible image is formed according to the third adhesion amount, the amount of the invisible developer is preferably controlled to be greater than the amount of the invisible developer that is used when the invisible image is formed according to the first adhesion amount.

As described above, in a case in which the amount of the invisible material is decreased or increased, the controller of the present embodiment performs control to adjust the amount of toner on the image bearer, so as to adjust the amount of toner adhering onto the intermediate transferor (e.g., the intermediate transfer belt 11). The rate of the toner transferred from the intermediate transferor onto the recording medium may vary depending on the type of the recording medium or the environment. Controlling the amount of the invisible developer as described above reduces the influence of such variation in the rate depending on the type of the recording medium or the environment. Since the confidentiality (or invisibility) is determined by the adhesion amount of the visible developer or the invisible developer on the recording medium, the above description is based on the adhesion amount on the recording medium.

In the present embodiment, the controller may perform control to adjust the amount of the invisible developer on the recording medium. In this case, however, the accuracy of the amount of the invisible developer may be lower than the accuracy of the amount of the invisible developer on the intermediate transferor or the image bearer adjusted.

In addition, as described above, the controller of the present embodiment changes the size of the invisible image. The controller chooses, e.g., a first way, a second way, or a third way as described below to perform control. For example, the first way is a way of forming an image according to the size of an invisible image and the amount of an invisible developer per unit area in the invisible image formed below a visible image. The second way is a way of forming an invisible image larger than the invisible image formed in the first way. The controller preferably chooses the second way to cause the image forming device to form an invisible image with the invisible developer smaller in amount than the invisible developer used in the first way.

The third way is a way of forming an invisible image smaller than the invisible image formed in the first way. The controller preferably chooses the third way to cause the image forming device to form an invisible image with the invisible developer greater in amount than the invisible developer used in the first way. Thus, the controller preferably selects one of the first way, the second way, and the third way as appropriate to perform control.

In the present embodiment, the controller preferably performs control according to one of a brightness of a visible image and a color difference between the visible image and an invisible image. For example, the controller preferably controls the adhesion amount of the invisible developer on the recording medium, according to one of the brightness of the visible image and the color difference between the visible image and the invisible image. Such control attains advantages such as ensuring the invisibility of the invisible image and enhancing the machine readability of the invisible image. Since the visibility of an invisible image formed below a visible image changes depending on the visible image, the controller of the present embodiment more appropriately controls the adhesion amount of invisible developer and ensures the invisibility of the invisible image compared to a typical controller.

For example, the controller decreases the adhesion amount of invisible developer in a case in which the brightness of the visible image is relatively high; whereas the controller increases the adhesion amount of invisible developer in a case in which the brightness of the visible image is relatively low. Alternatively, the controller decreases the adhesion amount of invisible developer in a case in which the color difference between the visible image and the invisible image is relatively small; whereas the controller increases the adhesion amount of invisible developer in a case in which the color difference between the visible image and the invisible image is relatively large. In addition, the controller preferably changes the size of the invisible image.

As described above, the adhesion amount of invisible developer herein refers to an amount of an invisible developer per unit area in an invisible image formed on a recording medium. The way of obtaining the color difference is not particularly limited. For example, the color difference is obtained by the L*a*b* color space.

Referring now to FIGS. 8A to 8D, a detailed description is given of the table presented in FIG. 7.

As illustrated in FIG. 7, the adhesion amount of visible developer per unit area on a recording medium varies depending on the type of the visible image. For example, the amount of the visible developer increases in the order of (1) cyan-hatched image, (4) blue-solid image, and (6) black-solid image in FIG. 7. Since the (1) cyan-hatched image includes a relatively small amount of visible developer per unit area, the invisible image 500 formed below the visible image is likely to be visually recognized. By contrast, the (6) lack-solid image includes a relatively large amount of visible developer per unit area, the invisible image 500 formed below the visible image is unlikely to be visually recognized.

As illustrated in FIG. 7, in a case in which the visible image includes a relatively small adhesion amount of visible developer, the controller decreases the amount of the invisible developer to ensure the invisibility. On the other hand, in a case in which the amount of the invisible developer is relatively small, the controller increases the size of the invisible image to ensure the machine readability.

FIGS. 8A to 8D illustrate examples of images resulting from such control.

Figure 8A:
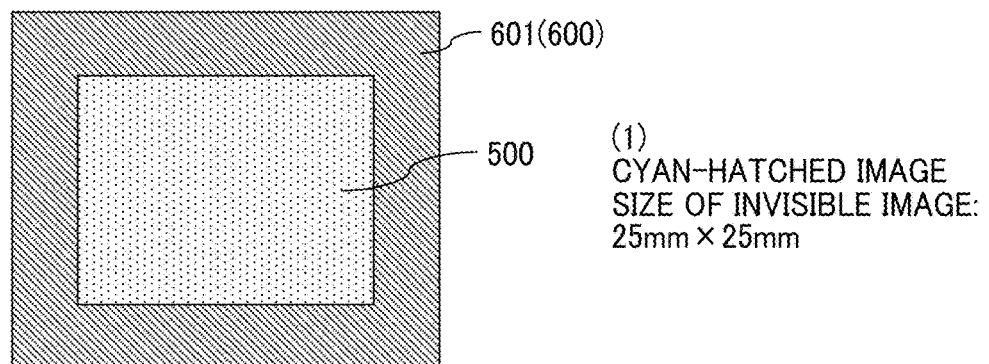
FIG. 8A is a plan view of a first example of a visible image on an invisible image on a recording medium according to an embodiment of the present disclosure.
Figure 8B:
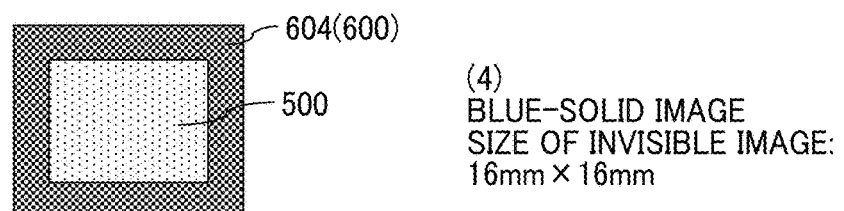
FIG. 8B is a plan view of a second example of the visible image on the invisible image on the recording medium.
Figure 8C:
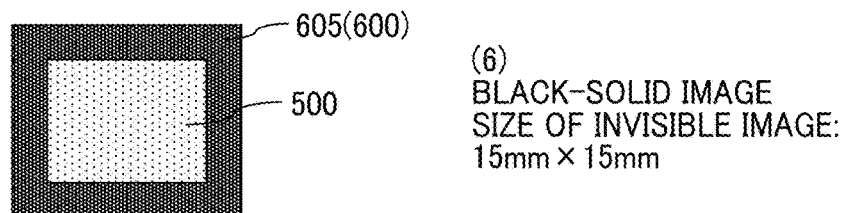
FIG. 8C is a plan view of a third example of the visible image on the invisible image on the recording medium.

FIGS. 8A to 8C schematically illustrate the size of the invisible image on which the (1) cyan-hatched image, the (4) blue-solid image, and the (6) black-solid image are formed as visible images, respectively.

Specifically, FIG. 8A is a schematic diagram illustrating the cyan image 601 as the visible image 600 formed on the invisible image 500. FIG. 8B is a schematic diagram illustrating a blue image 604 as the visible image 600 formed on the invisible image 500. FIG. 8C is a schematic diagram illustrating a black image 605 as the visible image 600 formed on the invisible image 500.

Note that FIGS. 8A to 8C are schematic diagrams illustrating the visible image and the invisible image as viewed from above. The visible image 600 formed on the invisible image 500 is omitted for the sake of clarification.

As illustrated in FIGS. 8A to 8C, the size of the invisible image 500 varies depending on the type of the visible image 600. Such control attains both the invisibility of the invisible image and the machine readability.

On the other hand, in a case in which the size of the invisible image is changed, the size of the invisible image may be greater than the size of the visible image. In the examples illustrated in FIGS. 8A to 8C, the visible image 600 larger than the invisible image 500 hide the invisible image 500 and therefore the invisible image 500 is unlikely to be visually recognized. By contrast, in a case in which the size of the invisible image 500 is greater than the size of the visible image 600, the invisible image 500 may be exposed on the surface of the recording medium and visually recognized.

Figure 8D:
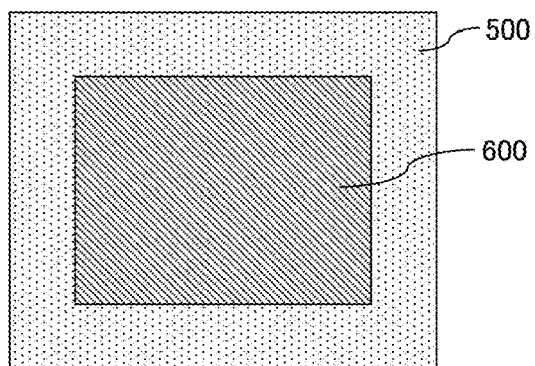
FIG. 8D is a plan view of a fourth example of the visible image on the invisible image on the recording medium.

FIG. 8D is a schematic diagram illustrating an example in which the size of the invisible image 500 is greater than the size of the visible image 600.

In other words, FIG. 8D is a schematic diagram illustrating the visible image 600 formed on the invisible image 500, which is larger than the visible image 600. As illustrated in FIG. 8D, the invisible image 500 has an exposed portion on which the visible image 600 is not formed. In other words, the invisible image 500 extends over a blank area (i.e., a portion in which the visible image 600 is not formed) of the recording medium.

To address such a situation, in the present embodiment, the controller preferably changes the position at which the invisible image is formed, according to the information of the visible image. For example, the position at which the invisible image is changed is so that the invisible image is formed below the visible image. Such a change of the position of the invisible image prevents exposure of the invisible image on the surface of the recording medium and reduces the possibility of visual recognition of the invisible image.

The position at which the invisible image is formed is changeable as appropriate. For example, with the information of the visible image and the size of the invisible image, the invisible image in the image information is moved in pixel units to find a position at which the invisible image is not exposed on the surface of the recording medium or a position at which few portions of the invisible image are exposed on the surface of the recording medium. The invisible image is formed on the recording medium according to the positional information of the invisible image thus found.

In addition, the image forming apparatus according to the present embodiment preferably includes a display (e.g., a display 400 illustrated in FIG. 1) that presents at least one of positional information of an invisible image and a size of the invisible image to, e.g., a user before the image forming device forms the invisible image on a recording medium. Such a display allows the user to confirm whether the invisible image is appropriate in advance before image formation. As described above, according to the present embodiment, at least one of the position and the size of the invisible image is changed in a case in which the at least one of the position and the size of the invisible image is not appropriate, thus reducing wasteful printing.

The display is selectable as appropriate. For example, a panel may be used as the display. In this case, before an invisible image is formed, at least one of the size of the invisible image and the positional information indicating where the invisible image is formed are displayed on the panel. Alternatively, such a size and information may be displayed on a display provided separately from the image forming apparatus.

As described above with reference to FIGS. 4A and 4B, an invisible developer including a colorant reflects light having a wavelength in the visible spectrum. In other words, an invisible image formed with such an invisible developer is likely to be visually recognized. For example, an invisible image formed with an invisible developer having a yellow color or yellow color tone is likely to be visually recognized. To address such a situation, in the present embodiment, the controller preferably controls the amount of the invisible developer adhering onto the recording medium, according to, e.g., the brightness or glossiness of the invisible image. Accordingly, even in a case in which an invisible image is formed with an invisible developer including a colorant, the invisibility of the invisible image is ensured. In addition, the controller preferably changes the size of the invisible image.

In one or more embodiments of the present disclosure, the invisible material is selectable as appropriate. For example, the invisible material may be a transparent invisible material including a near-infrared absorbing material. In the embodiment described above, a transparent (or substantially transparent) invisible developer is mainly used.

In one or more embodiments of the present disclosure, the transparent invisible developer (i.e., toner) refers to a toner including a sufficiently small amount (e.g., 1/10 or less) of colorant (e.g., a coloring pigment, a coloring dye, black carbon particles, or black magnetic powder) exhibiting coloring due to the action of light absorption or light scattering, as compared with black, yellow, cyan, and magenta toners. The transparent invisible developer also refers to a toner that does not contain such a colorant. The transparency of the transparent invisible developer in the present embodiment is slightly yellowish depending on the types and amounts of the binder resin, wax, and external additive constructing the toner. However, the transparent invisible developer is substantially transparent as compared with a color toner such as a magenta toner. In the following description, a transparent toner including an infrared absorbing material may be referred to as an infrared (IR) toner.

Other than the material described above, a black invisible material including a near-infrared absorbing material may be used as the invisible material. Examples of such an invisible material include, but are not limited to, a black toner. The black toner includes a black colorant such as carbon black. The black toner is different from other color toners such as yellow, magenta, and cyan toners in that the black toner includes, e.g., the carbon black that absorbs infrared light. In other words, the black toner is readable by an infrared reader (or scanner). Such a characteristic allows formation of an invisible image (specifically, a black invisible image) that is normally invisible and readable by an infrared reader.

As described in the above example, the black image forming station 10D employing the black toner may be used as an image forming station that employs an invisible developer. In other words, the yellow (Y), magenta (M), and cyan (C) visible images are superimposed on the black (K) image, thus rendering the black (K) image invisible. In short, the black (K) image is rendered as an invisible image. In this case, the invisible material is the black toner.

Now, a detailed description is given of another embodiment of the present disclosure. Specifically, a description is given of an example in which the black toner is used as an invisible material.

In a case in which the black toner is used as an invisible material, the image illustrated in FIG. 2 may be formed, for example. The invisible image 500 is a black (K) image in the image illustrated in FIG. 2. In the following description, the invisible image 500 of black (K) may be referred to as an invisible image 500(K). In addition, an invisible image of black (K) may be referred to as an invisible image (K).

In the present embodiment, since the invisible image 500(K) is formed below the visible image 600, the invisible image 500(K) may be described as being embedded in the visible image 600. The invisible image 500(K), formed below the visible image 600, is an image that is not visually recognized or is unlikely to be visually recognized. However, in the present embodiment, since the invisible image 500 is black (as the invisible image 500(K)) unlike the invisible image 500 formed with the invisible developer (e.g., IR toner) in the embodiment described above, the rate of the visible image 600 is to be higher than the rate of the visible image 600 of the embodiment described above.

In consideration of the relative positions of the invisible image 500(K) (as the invisible image (K)) and the visible image 600 on the recording medium, a black image forming station 10 is preferably located downstream from the other image forming stations 10 in the direction of rotation of the intermediate transfer belt 11. However, the location of the black image forming station 10 is not limited to the aforementioned location. Alternatively, for example, any one of the image forming stations 10A, 10B, and 10C in the example illustrated in FIG. 1 may be used as a black image forming station, provided that the invisible image 500(K) (as the invisible image (K)) is the lowermost layer of the composite image (including the visible and invisible images) on the recording medium.

In the present embodiment, a way of increasing the rate of a visible image (e.g., the visible image 600) is selectable as appropriate. For example, visible images may be stacked, including the visible image 600.

Figure 9:
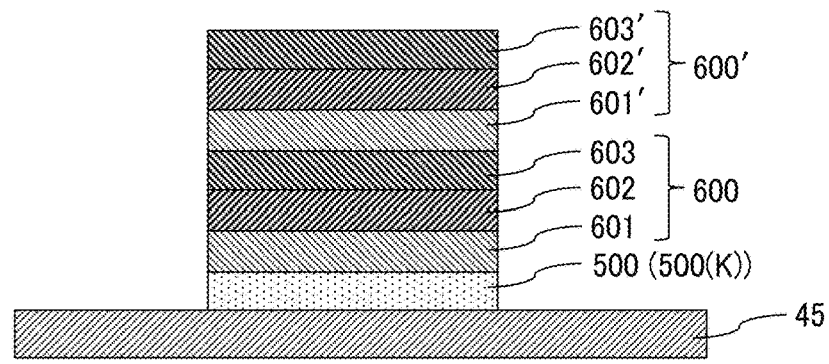
FIG. 9 is a schematic cross-sectional view of an image on a recording medium according to an embodiment of the present disclosure.

FIG. 9 schematically illustrates an image in which visible images are stacked, including the visible image 600.

Specifically, as illustrated in FIG. 9, the visible image 600 rests on the invisible image 500 formed on the recording medium 45. On the visible image 600, a visible image 600' including a cyan image 601', a magenta image 602', and a yellow image 603' rests.

Now, a description is given of an image forming apparatus according to the present embodiment.

The image forming apparatus of the present example includes a reconveying device that is disposed downstream from an image forming device in a recording medium conveyance direction, which is a direction of conveyance of a recording medium, to reconvey the recording medium to the image forming device. The image forming apparatus of the present example has an image forming mode to execute a first step of causing the image forming device to form an image including an invisible image on a recording medium, a second step of causing the reconveying device to reconvey a surface bearing the image including the invisible image of the recording medium to the image forming device, and a third step of causing the image forming device to form a visible image on the recording medium. In the image forming mode, for example, the first step, the second step, and the third step are executed in this order.

The reconveying device is, e.g., a duplex device. Now, a description is given of an example in which a duplex device is used as the reconveying device. In an image forming apparatus including a duplex device, for example, a recording medium passes through the duplex device a plurality of times. In other words, the recording medium is subjected to the transfer and fixing processes the plurality of times.

Figure 10:
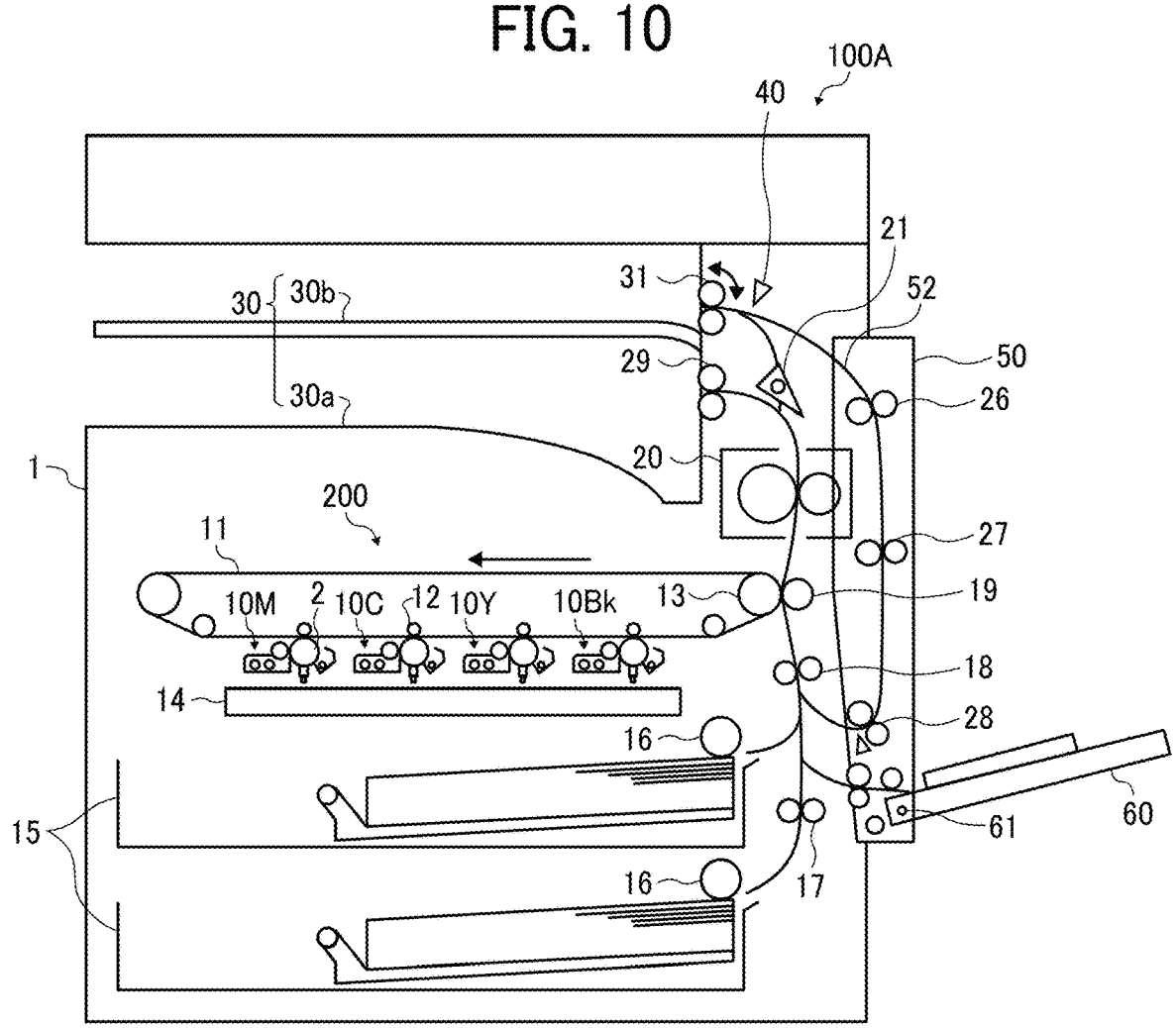
FIG. 10 is a schematic diagram illustrating another example of the image forming apparatus of FIG. 1.

Referring now to FIG. 10, a description is given of the image forming apparatus including the duplex device of the present example.

An image forming apparatus 100A of the present example includes the intermediate transfer belt 11, which is an intermediate transferor as an image bearer entrained around a plurality of rollers, in a substantially central portion of a housing 1 of the image forming apparatus 100A. Four image forming stations 10M, 10C, 10Y, and 10Bk serving as image forming units are disposed along a surface of the intermediate transfer belt 11 facing downward in a vertical direction in FIG. 10.

Each of the image forming stations 10M, 10C, 10Y, and 10Bk includes the photoconductor 2 as a latent image bearer. The photoconductor 2 is surrounded by, e.g., a charger, a developing device, and a cleaner. The primary transfer roller 12 as a primary transfer device is disposed inside a loop formed by the intermediate transfer belt 11, at a position facing the photoconductor 2.

Below the image forming stations 10M, 10C, 10Y, and 10Bk is an optical writing device 14 serving as an exposure device. The optical writing device 14 includes, e.g., a polygon mirror and a mirror group to irradiate, with a modulated laser beam, the surface of the photoconductor 2 of each of the image forming stations 10M, 10C, 10Y, and 10Bk.

In a lower portion of the housing 1, two input trays 15 are vertically disposed in FIG. 10. Each of the two input trays 15 is provided with the sheet feeding roller 16. The conveyance roller pair 17 is disposed to convey an image recording sheet such as a transfer sheet fed by the sheet feeding roller 16. Note that the image recording sheet may be simply referred to as a "sheet" in the following description. A registration roller pair 18 is disposed above the conveyance roller pair 17 in FIG. 10, downstream from the conveyance roller pair 17 in the recording medium conveyance direction, which may be referred to as a sheet conveyance direction in the following direction. Above the registration roller pair 18 is the secondary transfer roller 19 serving as a secondary transfer device. The secondary transfer roller 19 is disposed facing the secondary transfer opposed roller 13, which is one of the rollers around which the intermediate transfer belt 11 is entrained.

The fixing device 20 is disposed downstream from the secondary transfer roller 19 in the sheet conveyance direction. Above the fixing device 20 is a switching claw 21 that switches the sheet conveyance direction. The switching claw 21 is switched by an actuator such as a solenoid.

Two output trays 30 (including a lower output tray 30a and an upper output tray 30b) are vertically provided above the housing 1. The lower output tray 30a serves as an upper face of the housing 1. An output roller pair 29 is located to the upper left of the fixing device 20 in FIG. 10 to eject a sheet onto the lower output tray 30a. An output roller pair 31, which is rotatable in forward and reverse directions, is located above the output roller pair 29 to eject a sheet onto the upper output tray 30b.

A duplex device 50 serving as a reconveying device is disposed on a side portion of the housing 1. The duplex device 50 includes part of a sheet refeeding passage 52 along which a reversed sheet is refed. The sheet refeeding passage 52 starts at the output roller pair 31 that ejects a sheet onto the upper output tray 30b and ends at a point at which the sheet refeeding passage 52 joins a sheet conveyance passage, along which a sheet is conveyed from the input tray 15, before the registration roller pair 18. Conveyance roller pairs 26, 27, and 28 are located so as to substantially equally dividing the sheet refeeding passage 52 in the duplex device 50 into four.

The duplex device 50 further includes a bypass sheet feeding device. On a side of the duplex device 50, the bypass feeder 60 serving as a sheet stacker of the bypass sheet feeding device is disposed so as to be openable and closable with respect to the duplex device 50 with a rotation shaft 61 as a fulcrum. In the present example, however, the bypass feeder 60 may not be openable or closable with respect to the duplex device 50.

The registration roller pair 18 sends out a sheet selectively fed from one of the two input tray 15 or the bypass feeder 60 toward a secondary transfer area so that the sheet meets a toner image as a first image borne on the intermediate transfer belt 11 at the secondary transfer area. When the sheet bearing the toner image, which has been transferred from the intermediate transfer belt 11 at the secondary transfer area, passes through the fixing device 20, the toner image is fused and fixed onto the sheet under heat and pressure. The output roller pair 29 ejects the sheet bearing the fixed toner image onto the lower output tray 30a above the housing 1.

In the case of duplex printing, the switching claw 21 is switched as appropriate to convey the sheet bearing the toner image fixed onto one side of the sheet toward the output roller pair 31 that is rotatable in the forward and reverse directions. At this time, the output roller pair 31 is rotated in the forward direction (i.e., clockwise in FIG. 10). When a sensor 40 detects a trailing end of the sheet conveyed toward the upper output tray 30b by the output roller pair 31, the output roller pair 31 is rotated in the reverse direction (i.e., counterclockwise in FIG. 10) to feed the sheet to the sheet refeeding passage 52. The sheet is conveyed along the sheet refeeding passage 52 by the conveyance roller pairs 26, 27, and 28 to reach the registration roller pair 18.

Thus, the sheet is reversed by the output roller pair 31 that is rotatable in the forward and reverse directions and conveyed along the sheet refeeding passage 52 to be turned upside down. In short, the front and back sides of the sheet are reversed. Repeating such an operation once again turns the sheet upside down again. In short, the front and back sides of the sheet are reversed again. Thereafter, the front side of the sheet bearing the first image is conveyed to the image forming device 200. In other words, the sheet is conveyed to the image forming device 200 so that the front side of the sheet is subjected to image formation again. Specifically, at the secondary transfer area, another toner image as a second image is transferred from the intermediate transfer belt 11 onto the front side of the sheet. The sheet is then conveyed to the fixing device 20, which fixes the second image onto the first image on the sheet. Finally, the sheet bearing a plurality of image layers is ejected onto the lower output tray 30a.

Now, a description is given of an example of control.

In the present example, first, a visual image (or a toner image) formed with an invisible developer and a visual image formed with a visible developer are transferred and fixed onto a recording medium to form the invisible image 500(K) and the visible image 600, respectively. Subsequently, the recording medium passes through the duplex device 50 twice so that the recording medium is reconveyed to the image forming device 200. Subsequently, a visual image formed with a visible developer is transferred and fixed onto the visible image 600. Thus, the visible image 600' is formed on the visible image 600. In short, the visible image 600' is formed on the visible image 600. Thus, a plurality of visible images is formed to increase the visible image rate.

The visible image 600 and the visible image 600' may have different colors and densities from each other. For example, the visible image 600 may be a solid image of magenta; whereas the visible image 600' may be a halftone image of cyan and yellow.

In the present example, the invisible image 500(K) may be formed as the lowermost layer on the recording medium regardless of the position of the black image forming station 10. However, in order to place the visible image 600 in a shortest time, the black image forming station 10 is preferably located downstream from the other image forming stations 10 in the direction of rotation of the intermediate transfer belt 11. In the case of a direct transfer system is employed instead of an intermediate transfer system, the black image forming station 10 is preferably located upstream from the other image forming stations 10 in the direction of rotation of the intermediate transfer belt 11.

The configuration described above is not limited to the case in which the black image forming station 10 is used as an image forming station employing an invisible developer. Alternatively, an image forming station employing an invisible developer such as IR toner may be used as the image forming station employing the invisible developer. The number of visible image layers is not particularly limited and is selectable as appropriate. In the case of increasing the number of visible image layers, the number of times the recording medium passes through the duplex device 50 may be increased to, e.g., four times, six times, or eight times. Increasing the number of visible image layers also increases the visible image rate.

In the example of control described above, the visible image 600 and the visible image 600' are separately fixed on the recording medium. Specifically, when the recording medium passes through the fixing device 20 first, the visible image 600 is fixed. When the recording medium passes through the fixing device 20 next, the visible image 600' is fixed. Since the toner images are fixed onto the recording medium in a plurality of times, even a fixing device (or a fixing unit) providing a fixing performance like the fixing performance of a typical fixing device may fix the toner images without causing a fixing failure.

As described above, the duplex device 50 conveys a recording medium twice to reconvey a surface bearing an image including an invisible image of the recording medium to the image forming device 200, to increase the number of visible image layers on the recording medium.

Now, a description is given of another example of control.

In the present example, first, a visual image (or a toner image) formed with an invisible developer is transferred and fixed onto a recording medium to form the invisible image 500(K). Subsequently, the recording medium passes through the duplex device 50 twice. Subsequently, a visual image formed with a visible developer is transferred and fixed onto the invisible image 500(K). Thus, the visible image 600 is formed on the invisible image 500(K). Subsequently, the recording medium passes through the duplex device 50 twice. Subsequently, a visual image formed with a visible developer is transferred and fixed onto the visible image 600. Thus, the visible image 600' is formed on the visible image 600. In short, the visible image 600' is formed on the visible image 600. Thus, a plurality of visible images is formed to increase the visible image rate.

As described above, in the present embodiment, formation of a composite image including an invisible image (K) and visible images resting on the invisible image (K) on a recording medium allows embedment of additional information in the composite image. For example, embedding the invisible image (K) allows identification of an illegal copy. In the present embodiment, since the invisible image (K) is the lowermost layer of the composite image on the recording medium, the invisibility of the invisible image (K) is enhanced. In short, the invisible image (K) is unlikely to be visually recognized.

When the transfer and fixing processes are repeated with a recording medium passing through the duplex device 50, a visible image is formed on the invisible image (K) regardless of whether the invisible image (K) is formed as the lowermost layer. Accordingly, substantially the same advantages are attained as the advantages of the embodiment described above.

Although the above example describes an image forming apparatus including four image forming stations for black (K), yellow (Y), magenta (M), and cyan (C), the present embodiment is not limited to such an example. Alternatively, for example, the image forming apparatus may include five or more image forming stations employing at least, e.g., IR toner and the black (K), yellow (Y), magenta (M), and cyan (C) toners. Such an image forming apparatus including five or more image forming stations employing at least the black (K), yellow (Y), magenta (M), cyan (C), and IR toners forms two types of invisible images: an invisible image (K) and an invisible image (IR). In particular, a difference of the wavelength of infrared absorbed by the IR toner and the wavelength of infrared absorbed by the black toner allows production of a printed matter at a very high security level. Such a printed matter may be used for high-level authenticity determination.

As described above, in the present embodiment, two or more image forming stations may be used to form invisible images. As described above, for example, the image forming device may include a first image forming station employing a first invisible material and a second image forming station employing a second invisible material. The first invisible material is transparent and includes a near-infrared absorbing material; whereas the second invisible material is black and includes a near-infrared absorbing material.

As described above, according to the present embodiment, the image forming apparatus is provided that includes the image forming device that forms an image on a recording medium, the controller or circuitry that controls the image forming device, and a reconveying device that is disposed downstream from the image forming device in the recording medium conveyance direction (i.e., the direction of conveyance of the recording medium) to reconvey the recording medium to the image forming device. Specifically, the image forming device forms, on the recording medium, an invisible image with an invisible material and a visible image with a visible material on the invisible image. Thus, the image forming device forms a composite image including the visible image superimposed on the invisible image on the recording medium. The image forming apparatus of the present embodiment has an image forming mode to execute a first step of causing the image forming device to form an image including the invisible image on the recording medium, a second step of causing the reconveying device to reconvey a surface bearing the image including the invisible image of the recording medium to the image forming device, and a third step of causing the image forming device to form the visible image on the recording medium. In the image forming mode, the first step, the second step, and the third step are executed in this order.

As described above, for example, the first step includes forming a visual image with an invisible developer as an invisible material, transferring the visual image formed with the invisible developer onto the recording medium, and fixing the visual image onto the recording medium. The third step includes transferring a visual image formed with a visible developer as the visible material onto the recording medium and fixing the visual image onto the recording medium.

Now, a description is given of an image forming apparatus according to another embodiment of the present disclosure. The above embodiment is applied to an electrophotographic image forming apparatus that forms an image by electrophotography. The present embodiment is applied to an inkjet image forming apparatus that employs an inkjet system to form an image. A detailed description of the present embodiment like the above embodiment is herein omitted unless otherwise required.

The image forming apparatus of the present embodiment is an inkjet image forming apparatus that includes a first discharger and a second discharger. The first discharger discharges an invisible ink as an invisible material onto a recording medium. The second discharger discharges a visible ink as a visible material onto the recording medium onto which the invisible material is discharged.

Specifically, the image forming apparatus includes an image forming device that includes the first discharger and the second discharger. The image forming device forms, on the recording medium, an invisible image with the invisible ink and a visible image with the visible ink on the invisible image to form a composite image in which the invisible image is closer to the recording medium than the visible image is.

In a case in which the image forming device forms the invisible image according to the second adhesion amount, the controller adjusts an amount of the invisible ink to be discharged by the first discharger to be smaller than the amount of the invisible ink discharged by the first discharger in a case in which the image forming device forms the invisible image according to the first adhesion amount.

In the present embodiment, substantially the same configuration as the configuration of the embodiment described above is employed. The visible developer described in the above embodiment corresponds to the visible ink described in the present embodiment. Similarly, the invisible developer described in the above embodiment corresponds to the invisible ink described in the present embodiment. A detailed description of substantially the same matters as the matters described in the above embodiment is herein omitted unless otherwise required.

Figure 11:
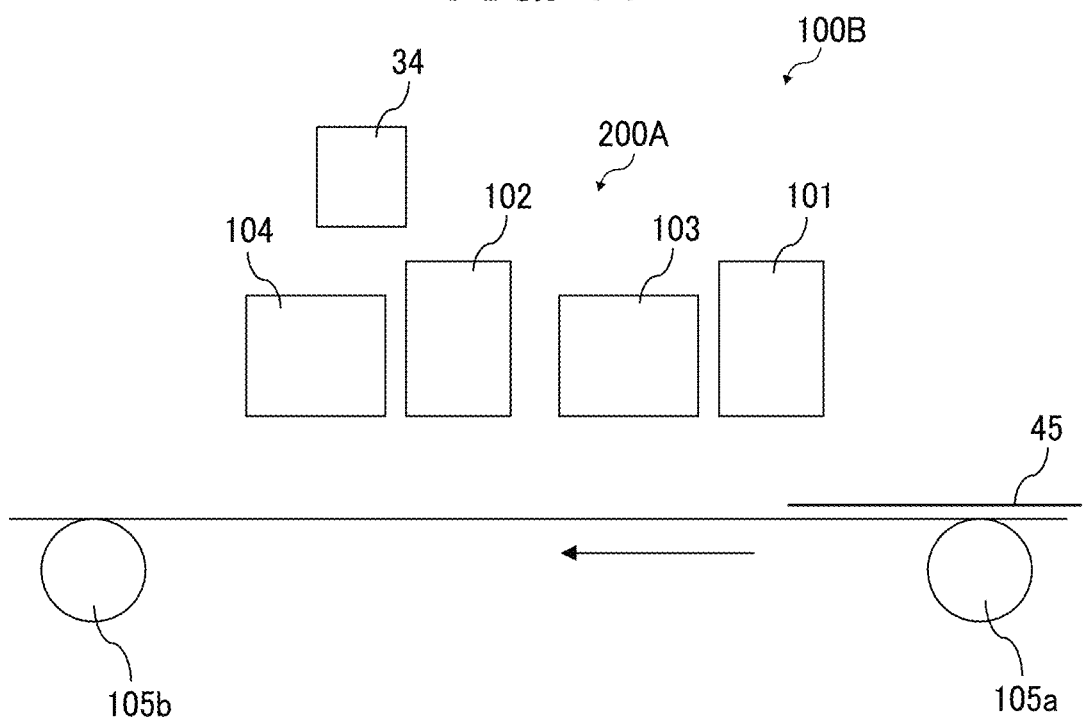
FIG. 11 is a diagram illustrating part of an image forming apparatus according to another embodiment of the present disclosure.

FIG. 11 illustrates an image forming apparatus 100B according to the present embodiment.

FIG. 11 illustrates, e.g., the controller 34, a first discharger 101, a second discharger 102, a first drier 103, a second drier 104, and conveyance rollers 105a and 105b. In FIG. 11, the arrow indicates the recording medium conveyance direction in which the recording medium 45 is conveyed. The first discharger 101 and the second discharger 102 may be collectively referred to as dischargers or discharger when the first discharger 101 and the second discharger 102 are described without distinction.

The discharger may be referred to as an image forming station. However, in a case in which the image forming apparatus employs the first invisible material and the second invisible material, an image forming station that employs the first invisible material is referred to as a first invisible image forming station; whereas an image forming station that employs the second invisible material is referred to as a second invisible image forming station. Thus, the first and second invisible image forming stations are distinguished from an image forming station that employs a visible material.

The first discharger 101 discharges an invisible ink as an invisible material onto the recording medium 45. The second discharger 102 discharges a visible ink as a visible material onto the recording medium 45. The first discharger 101 and the second discharger 102 may be inkjet heads, for example. In this case, the first discharger 101 and the second discharger 102 may be line heads or serial heads. The first discharger 101 and the second discharger 102 may be separately moved, or may be moved together, with a carriage, for example.

The first discharger 101 is disposed upstream from the second discharger 102 in the recording medium conveyance direction. Thus, the visible image formed with the visible ink rests on the invisible image formed with the invisible ink on the recording medium. In other words, the visible image is formed on the invisible image.

In the present embodiment, the visible ink and the invisible ink are different from each other in, e.g., the degree of absorption of visible light and the degree of absorption of infrared light.

The visible ink and the invisible ink are also different from each other in material. For example, the visible ink and the invisible ink are different from each other in whether an infrared light absorbing material is included. Specifically, the invisible ink includes the infrared light absorbing material; whereas the visible ink does not include or substantially does not include the infrared light absorbing material. The infrared light absorbing material is, e.g., a near-infrared light absorbing material. For example, a typical near-infrared light absorbing material may be used as the near-infrared light absorbing material.

The invisible ink may include a colorant and may have a color tone. Like the embodiment described above, in the present embodiment, the invisible material may be a transparent ink including a near-infrared absorbing material or may be a black ink including a near-infrared absorbing material. Note that the transparent ink may be referred to as an IR ink.

In the present embodiment, the image forming apparatus 100B includes the first drier 103 and the second drier 104 that dry the inks discharged by the first discharger 101 and the second discharger 102, respectively. The first drier 103 and the second drier 104 may be typical driers such as heaters or hot air generators.

In an example, the first drier 103 may be omitted. In this case, for example, after the first discharger 101 discharges ink, the second drier 104 dries the ink, without the second discharger 102 discharging ink. Subsequently, a reconveying device conveys the recording medium 45 again to an image forming device 200A that includes, e.g., the first discharger 101 and the second discharger 102. The second discharger 102 discharges ink, which is then dried. Thus, ink bleeding is prevented.

Like the embodiment described above, in the present embodiment, in a case in which the image forming device 200A forms the invisible image according to the second adhesion amount, the controller 34 adjusts an amount of the invisible ink to be discharged by the first discharger 101 to be smaller than the amount of the invisible ink to be discharged by the first discharger 101 in a case in which the image forming device 200A forms the invisible image according to the first adhesion amount. Accordingly, the invisibility of the invisible image is enhanced.

Like the embodiment described above, in the present embodiment, in a case in which the image forming device 200A forms the invisible image according to the second adhesion amount, the controller 34 adjusts the size of the invisible image to be greater than the size of the invisible image formed according to the first adhesion amount. Thus, like the embodiment described above, the present embodiment ensures the machine readability of the invisible image. In other words, the present embodiment attains both the invisibility and machine readability of the invisible image.

In the present embodiment, for example, the following equation is used to obtain respective amounts of the visible material and the invisible material per unit area in a portion, in which the visible image is formed on the invisible image, of a composite image, as a given image, including the visible image and the invisible image.

Adhesion amount per unit area=consumption amount of ink used for image formation÷image area Like the embodiment described above, in the present embodiment, the controller 34 preferably changes the amount of the invisible material per unit area in the invisible image on the recording medium, according to one of the brightness of the visible image and the color difference between the visible image and the invisible image. For example, the controller 34 preferably controls the amount of the invisible ink to be discharged onto the recording medium, according to one of the brightness of the visible image and the color difference between the visible image and the invisible image. Such control attains advantages such as ensuring the invisibility of the invisible image and enhancing the machine readability of the invisible image. Since the visibility of an invisible image formed below a visible image changes depending on the visible image, the controller of the present embodiment more appropriately controls the adhesion amount of invisible developer and ensures the invisibility of the invisible image compared to a typical controller.

Referring now to FIG. 12, a description is given of another example of the image forming apparatus according to the present embodiment.

Like the embodiment described above, in the present embodiment, the image forming apparatus preferably has the image forming mode as described above. The image forming apparatus of the present example includes a reconveying device that is disposed downstream from the image forming device in the recording medium conveyance direction to reconvey the recording medium to the image forming device. The image forming apparatus of the present example has the image forming mode to execute a first step of causing the image forming device to form an invisible image on a recording medium, a second step of causing the reconveying device to reconvey the recording medium to the image forming device, and a third step of causing the image forming device to form a visible image on the recording medium. In the image forming mode, the first step, the second step, and the third step are executed in this order. In a case in which another visible image is formed on the visible image, the second step and the third step are repeated at least one more time.

FIG. 12 illustrates an image forming apparatus 100C of the present example.

In the present example, an invisible ink is discharged onto the recording medium 45 by the first discharger 101 and dried by the first drier 103 or the second drier 104. Thus, an invisible image is formed. Subsequently, a reconveying device 700 including a conveyance roller 710 reconveys the recording medium 45 to the image forming device 200A. Subsequently, a visible ink is discharged onto the recording medium 45 by the second discharger 102 and dried by the second drier 104. Thus, a visible image as a first visible image is formed on the invisible image. In other words, a composite image including the visible image formed on the invisible image is obtained.

The recording medium 45 bearing the composite image may be then ejected. In a case in which another visible image as a second visible image is formed on the first visible image, the reconveying device 700 conveys the recording medium 45 to the image forming device 200A. Subsequently, the visible ink is discharged onto the recording medium 45 by the second discharger 102 and dried by the second drier 104. Thus, the second visible mage is formed on the first visible image. In other words, as illustrated in FIG. 9, the visible image 600' is formed on the visible image 600. Thus, a plurality of visible images is formed to increase the visible image rate.

In the present example, the reconveying device 700 is a device dedicated to reconveying. The reconveying device is not limited to the reconveying device 700. As described above in the embodiment described above, the recording medium may pass through a general duplex device a plurality of times.

According to the embodiments of the present disclosure, an image forming apparatus enhances the invisibility of an invisible image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image forming apparatus, comprising:
   an image forming device configured to form an image on a recording medium, the recording medium including a first surface and a second surface; and
   a duplex device disposed downstream from the image forming device in a direction of conveyance of the recording medium to turn over the first surface of the recording medium, on which the image is formed, from facing a first direction to facing a second direction opposite of the first direction, and reconvey the recording medium to the image forming device, wherein
   to form the image on the first surface of the recording medium, the image forming device is configured to:
   form a part of the image on the first surface of the recording medium, the first surface facing the first direction;
   pass the recording medium through the duplex device which turns over the recording medium so as to reconvey the second surface of the recording medium facing the first direction to the image forming device;

pass the recording medium through the image forming device with the second surface facing the first direction;

pass the recording medium through the duplex device which turns over the recording medium so as to the first surface of the recording medium facing the first direction to the image forming device; and form a rest of the image on the first surface of the recording medium, in this order.

2. The image forming apparatus according to claim 1, wherein the image forming device includes:

a transfer device to transfer the image on the recording medium; and a fixing device to fix the image to the recording medium.

3. An image forming apparatus, comprising:

an image forming device configured to form an image on a recording medium, the recording medium including a first surface and a second surface; and a duplex device disposed downstream from the image forming device in a direction of conveyance of the recording medium to turn over first surface of the recording medium, on which the image is formed, from facing a first direction to facing a second direction opposite of the first direction, and reconvey the recording medium to the image forming device, wherein to form the image on the first surface of the recording medium, the image forming device is configured to:

form a part of the image on the first surface of the recording medium;

pass the recording medium through the duplex device which turns over the recording medium so as to reconvey the second surface of the recording medium facing the first direction to the image forming device;

pass the recording medium through the image forming device with the second surface facing the first direction;

pass the recording medium through the duplex device which turns over the recording medium so as to the first surface of the recording medium facing the first direction to the image forming device;

form another part of a rest of the image on the first surface of the recording medium;

repeat the passing and the forming to complete formation of the image on the first surface of the recording medium, in this order.

4. The image forming apparatus according to claim 3, wherein the image forming device includes:

a transfer device to transfer the image on the recording medium; and a fixing device to fix the image to the recording medium.

5. An image forming apparatus, comprising:

an image forming device;

a duplex device disposed downstream from the image forming device in a direction of conveyance of a recording medium to turn over a first surface of the recording medium from facing a first direction to facing a second direction opposite the first direction, and reconvey the recording medium to the image forming device, wherein the recording medium includes the first surface and the second surface; and circuitry configured to control the image forming device to form an invisible image with an invisible material on the first surface of the recording medium, the first surface facing the first direction;

pass the recording medium through the duplex device which turns over the recording medium so as to reconvey the second surface of the recording medium facing the first direction to the image forming device;

pass the recording medium through the image forming device with the second surface facing the first direction;

pass the recording medium through the duplex device which turns over the recording medium so as to the first surface of the recording medium facing the first direction to the image forming device; and form a visible image including a visible material on the invisible image to form a composite image on the first surface of the recording medium.

6. An image forming apparatus according to claim 5, wherein the image forming device includes:

a transfer device to transfer the visible image on the recording medium; and a fixing device to fix the visible image to the recording medium.

7. The image forming apparatus according to claim 5, wherein the circuitry is configured to control the image forming device to:

form a first visual image with an invisible developer as the invisible material;

transfer the visual image formed with the invisible developer onto the recording medium; and fix the transferred visual image onto the recording medium, to form the invisible image on the recording medium, and the circuitry is configured to control the image forming device to:

form a second visual image with a visible developer as the visible material;

transfer the visual image formed with the visible developer onto the recording medium; and fix the transferred visual image onto the recording medium, to form the visible image on the recording medium.

8. The image forming apparatus according to claim 5, wherein the circuitry is further configured to, in a case in which (1) a first adhesion amount includes respective adhesion amounts of the visible material and the invisible material per unit area in a portion, the portion in which the visible image is formed on the invisible image of the composite image, and (2) a second adhesion amount is smaller than the first adhesion amount and includes the respective adhesion amounts of the visible material and the invisible material per unit area in the portion:

adjust an amount of the invisible material included in the second adhesion amount to be smaller than an amount of the invisible material included in the first adhesion amount, such that the image forming device forms the image according to the second adhesion amount.

* * * * *